(12) United States Patent
Chang Chien

(10) Patent No.: US 6,837,153 B1
(45) Date of Patent: *Jan. 4, 2005

(54) STRUCTURE OF A FRUIT AND VEGETABLE PROCESSOR

(76) Inventor: Sung Shan Chang Chien, PMB#1008, 1867 Ygnacio Valley Rd., Walnut Creek, CA (US) 94598

( * ) Notice: Subject to any disclaimer, the term of this patent is extended or adjusted under 35 U.S.C. 154(b) by 0 days.

This patent is subject to a terminal disclaimer.

(21) Appl. No.: 10/745,545

(22) Filed: Dec. 29, 2003

(51) Int. Cl.[7] .............................. A23L 1/00; A23N 1/00; A47J 43/06; A47J 43/07; B02C 19/12
(52) U.S. Cl. .............................. 99/510; 99/348; 99/492; 99/509; 241/199.12; 241/282.2; 366/205; 366/314
(58) Field of Search .......................... 99/348, 509–513, 99/485, 495, 467, 492; 366/205, 206, 96–98, 197, 199, 314, 315, 342, 343, 307, 309; 241/282.1, 282.2, 282.5, 292.1, 97, 46.17, 98, 199.12, 37.5, 92, 285.1, 285.2; 403/330, 206; D7/378

(56) References Cited

U.S. PATENT DOCUMENTS

| | | | | |
|---|---|---|---|---|
| 5,236,135 A | * | 8/1993 | Wilson et al. | 241/21 |
| 5,240,187 A | * | 8/1993 | Wilson | 241/21 |
| 5,405,096 A | * | 4/1995 | Seol | 241/282.1 |
| 6,082,648 A | * | 7/2000 | Marriere et al. | 241/282.1 |
| 6,189,441 B1 | * | 2/2001 | Beaudet et al. | 99/492 |
| 6,298,776 B1 | * | 10/2001 | Ekstrom | 99/509 |
| 6,299,085 B1 | * | 10/2001 | Ekstrom | 241/282.1 |
| 6,595,121 B1 | * | 7/2003 | Chang Chien | 99/510 |

* cited by examiner

Primary Examiner—Timothy F. Simone
(74) Attorney, Agent, or Firm—Leong C. Lei

(57) ABSTRACT

An improved structure of a fruit and vegetable processor is disclosed. The bottom section of one side of the circumferential edge of the cup body of the processor has a protruded passage which is in communication with the interior of the cup body. The passage is mounted with a filtering tube with filter so that the juice from the crushing of fruit and vegetable will be centrifuged to the cavity at the circumferential wall of the cup body when the blade rotates and the juice is filtered.

7 Claims, 8 Drawing Sheets ial edge, and an outlet component 36 is
STRUCTURE OF A FRUIT AND VEGETABLE PROCESSOR

BACKGROUND OF THE INVENTION (a) Technical Field of the Invention

The present invention relates to a processor, and in particular, to an improved structure of a fruit and vegetable processor where juice that extracted from crushing of fruit and vegetable is discharged directly out from the processor without pouring the juice by slanting the processor. The present invention provides efficient filtering to the juice extracted from fruit and vegetable.

(b) Description of the Prior Art

FIG. 1 shows a conventional fruit and vegetable processor including a base seat 11 having a top side mounted with a cup body. The opening of cup body 12 is covered with a cup cover 13 and the bottom side of the interior of the cup body 12 is provided with blade 14. The blade 14 is driven to rotate by a motor (not shown) positioned at the base seat 11. The bottom plate of the cup body 12 is provided with spaced apart blocking block 15. After food stuff is placed within the cup body 12, a control switch 16 at the base seat 11 is depressed and the motor is in operation, and the blade 14 is driven to rotate. The blocking block 15 is used as a blocking so that the food stuff is forced to move upward to avoid being driven to rotate by the blade. Thus the food stuff is crushed to produce juice. In this conventional processor 1, the blade 14 is rather width and this processor 1 is used for crushing stuff that do not require filtering. When a juice is thus produced, for instance, the juice is poured out by slanting the cup body 12.

However, there are instances when filtering of the crushed juice is required prior to drinking. In this case, a filter is placed on top of the container and therefore a hand is needed to hold the filter and the other hand holds the cup body. If the crushed juice is large amount, the holding of the cup body is not easy. Therefore, as shown in FIG. 2, the processor 2 has a base seat 21 having the top side mounted with a cup body 22. The interior of the cup body 22 has a motor (not shown) and the shaft of the motor is combined with the blade 23 at the bottom portion of the cup body 22. The blade 23 is shorter and the surrounding edge of the blade 23 is mounted with a hollow filtering cylinder 24. The top side of the filtering cylinder 24 is an opening and the cup cover 25 on the opening has a through hole. The opening urges the circumferential edge at the lower side of the through hole, and a plug cover 26 is inserted to the through hole of the cup cover 25. In operation, the plug cover 26 is lifted and food stuff is placed through the through hole to the interior of the filter cylinder 24. Next, the control switch 27 at the base seat is depressed and the motor drives the blade 23 to drive so as to crush the foodstuff. The mounting of the filter at the filtering cylinder 24, the residues are trapped at the interior of the filtering cylinder 24 and the juice passes through the filter between the cup body 22 and the filtering cylinder 24. The cup body 22 can be unloaded from the base seat 21 and the juice is poured by slanting the cup body 22 after the juice has been filtered.

In view of the above conventional processors, two types of processors are disclosed and it is not logical for a family to have two foodstuff processors. Accordingly, as shown in FIG. 3, a processor 3 has been exploited before. The processor 3 has a base seat 31 mounted with a cup body 32 and the top opening of the cup body 32 is mounted with a cup cover 33. The interior of the base seat 31 is mounted with a motor, which drives the blade 321 at the bottom side of the cup body 32 to rotate. The base plate 322 of the cup body 32 is filtered to one side and the lower side is provided with a plurality of spaced through holes 323. The lower side of the through hole 323 is a hollow passage 34 having one end head being protruded out from one side of the cup body 32. A plug component is inserted onto the passage 34 and the plug component is a filter body 35 having a filter at the circumferential edge, and an outlet component 36 is mounted to a connector 341 at the outlet of the passage 34. The outlet component 36 is provided with a valve 361 which control the flow from the outlet component. If bean type of food stuff is crushed, the juice will flow to the lower side of the base plate 322 and flow out through the through hole 323 of the passage 34. The filter 351 allows the juice to pass through the filter body 35 and the residue is stopped at the interior of the cup body 32. The valve 361 is turned to provide a smooth flow and the juice can be obtained via the outlet component 36 without unloading the cup body 32 from the base seat 31. In this conventional processor, the filtering is done by the weight of the juice without other supplementary aid. Thus, it takes a longer time to filter and the flow rate is slow. This is not convenient to those in the juice beverage business. Accordingly, it is an object of the present invention to provide an improved fruit and vegetable processor, which mitigates the above drawbacks.

SUMMARY OF THE INVENTION

Accordingly, it is an object of the present invention to provide an improved structure of a fruit and vegetable processor having a base seat mounted with a cup body with a cup cover on an opening at the upper side of the cup body, and having a blade at the bottom plate at the interior of the cup body, the blade being driven by a motor positioned at the interior of the base seat and a passage connecting the interior of the cup body and an outlet at the end of the passage, characterized in that the passage is located at the upper portion of the bottom plate below one side of the circumferential edge of the cup body.

Yet another object of the present invention is to provide an improved structure of a fruit and vegetable processor, wherein the rotation of the blade causes the juice produced from crushing of fruit and vegetable to be centrifuged and filtered.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar part.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
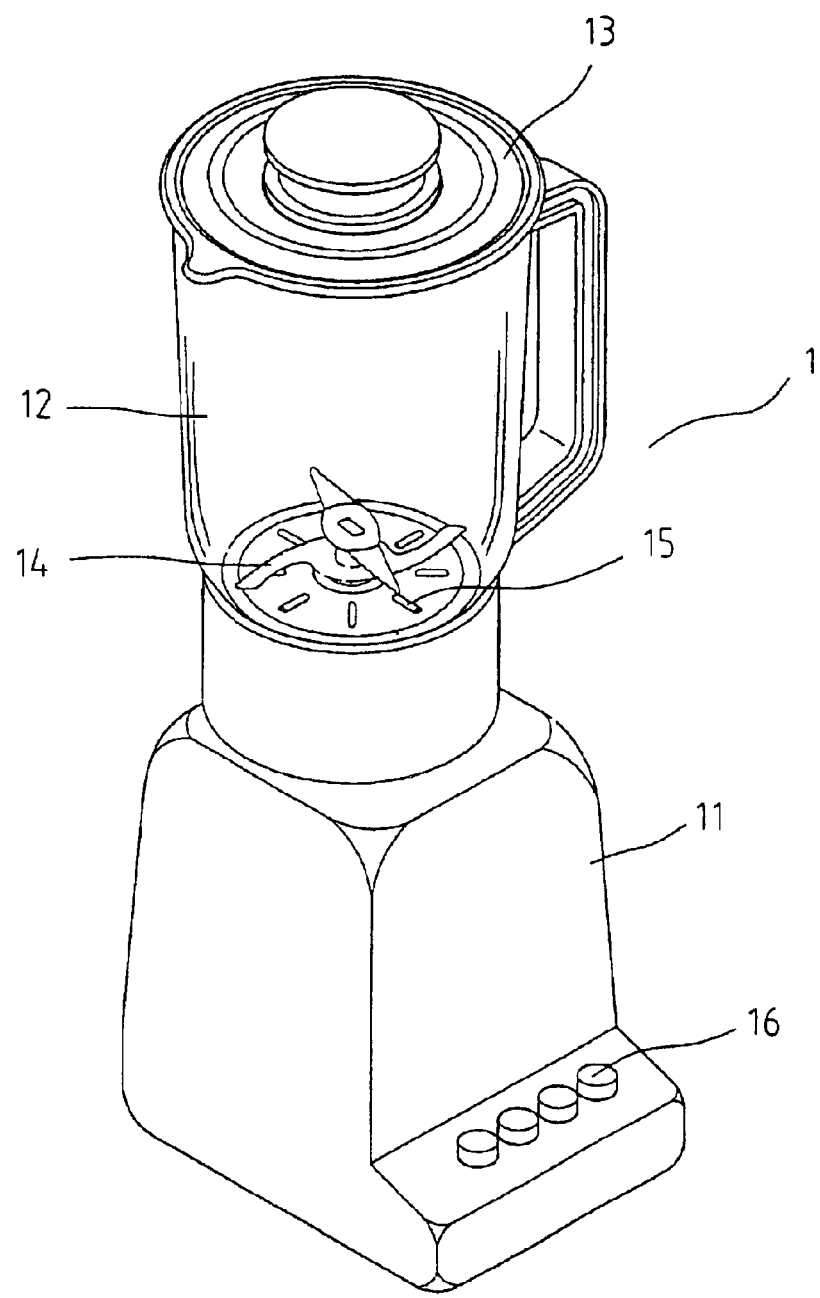
FIG. 1 is a perspective view of a conventional fruit and vegetable processor.
Figure 2:
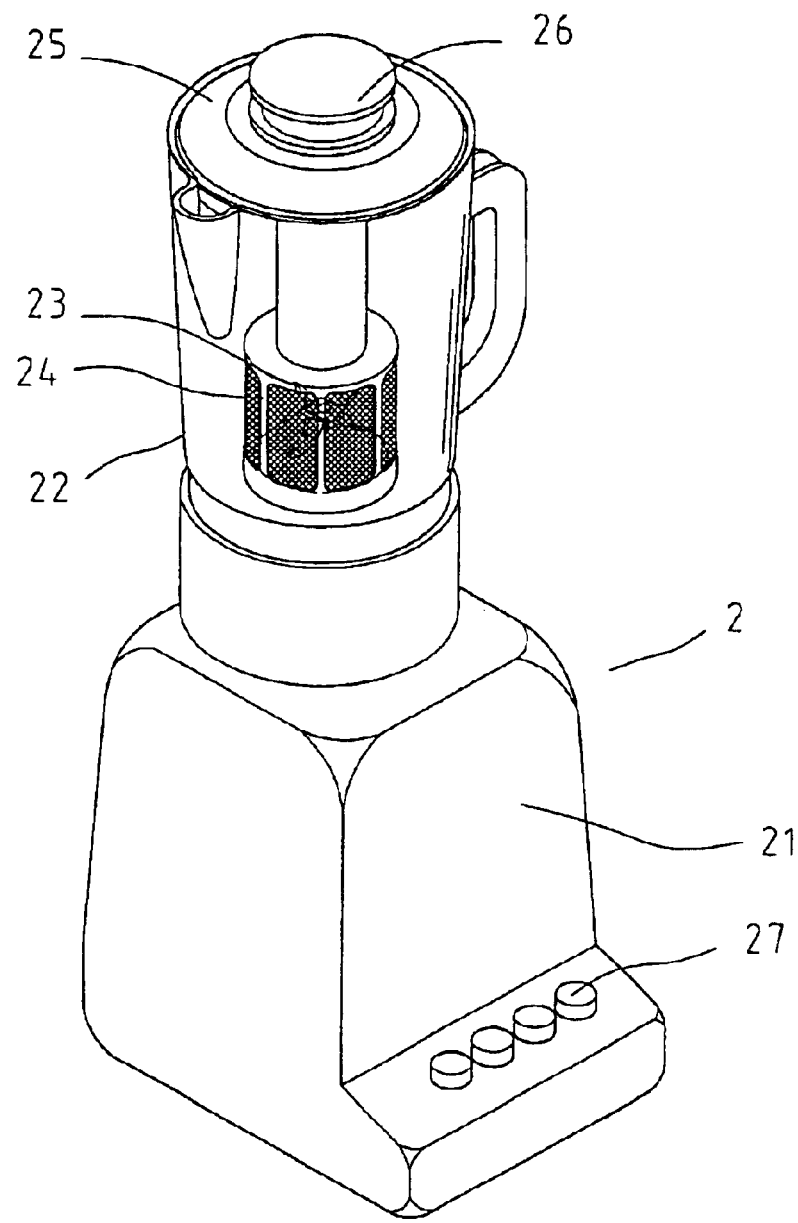
FIG. 2 is a perspective view of conventional fruit and vegetable processor.
Figure 3:
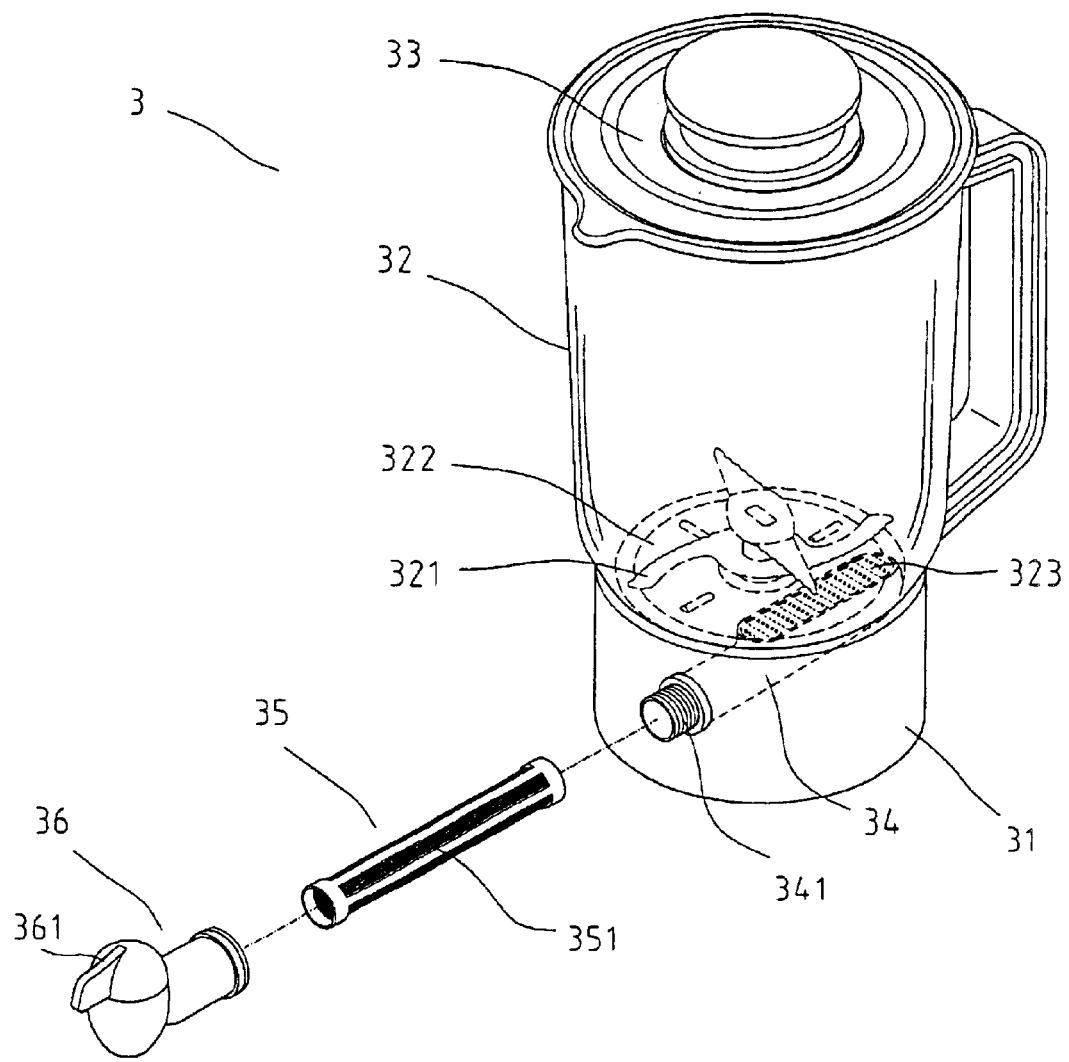
FIG. 3 is another perspective view of conventional fruit and vegetable processor.
Figure 4:
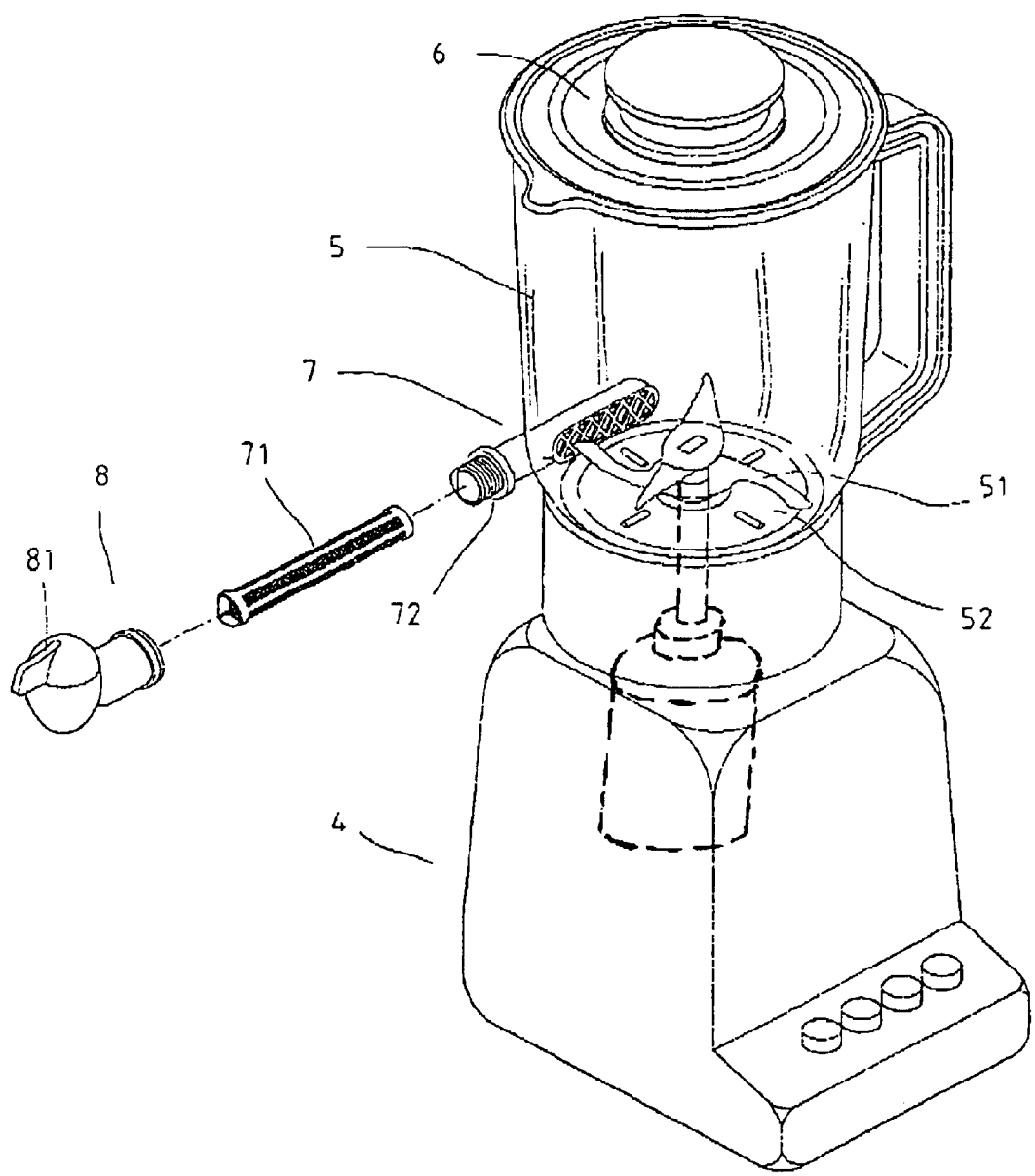
FIG. 4 is an exploded view of a preferred embodiment of the present invention.

Referring to FIG. 4, the fruit and vegetable processor includes a basic seat 4 mounted on with a cup body 5. The opening at the top portion of the cup body 5 has a cup cover 6 such that the cup body 5 is sealed. The bottom side of the interior of the cup body 5 has a blade 51 and the blade 51 is driven to rotate by a motor (not shown) positioned at the interior of the base seat 4 so as to crush food stuff. The top portion of a bottom plate 52 below one side of the circumferential edge of the cup body 5 is provided with a protruded passage 7, and the passage 7 is hollow, and the passage 7 and the interior of the cup body 5 are in communication with each other. The interior of the passage 7 has a plug component. In FIG. 4, the plug component is a filter body 71 having filter at the circumferential edge. The output at the end terminal of the passage is a connector 72 which is connected with an output component 8. The output component 8 is provided with a valve 81 which can control the flowing of the outlet component 8.

A filter body 71 is provided within the passage 7. When the crushed stuff is required to be filtered, the crushed stuff driven by the blade to rotate will form a turbulent within the interior of the cup body 5, and the juice is centrifuged outward to the connection region between the passage 7 and the cup body 5 so that the juice and the filter of the filter body 71 is formed into a compression force, and the juice flows to the filter body 71 in a greater volume and is discharged from the outlet component 8. The residue during the crushing process of fruit and vegetable is filtered by the filter along the circumferential edge of the filter body 71. This will improve the filtering efficiency and reduce the time of filtering. In practice, the center hole of the passage 7 has a non-circular cross-sectional hole. Similarly, the filter body 71 has a corresponding shape. Thus, when the filter body 71 is positioned at the passage 7, the mounting is secured and the vibration of the motor will not rotate the filter.

Figure 5:
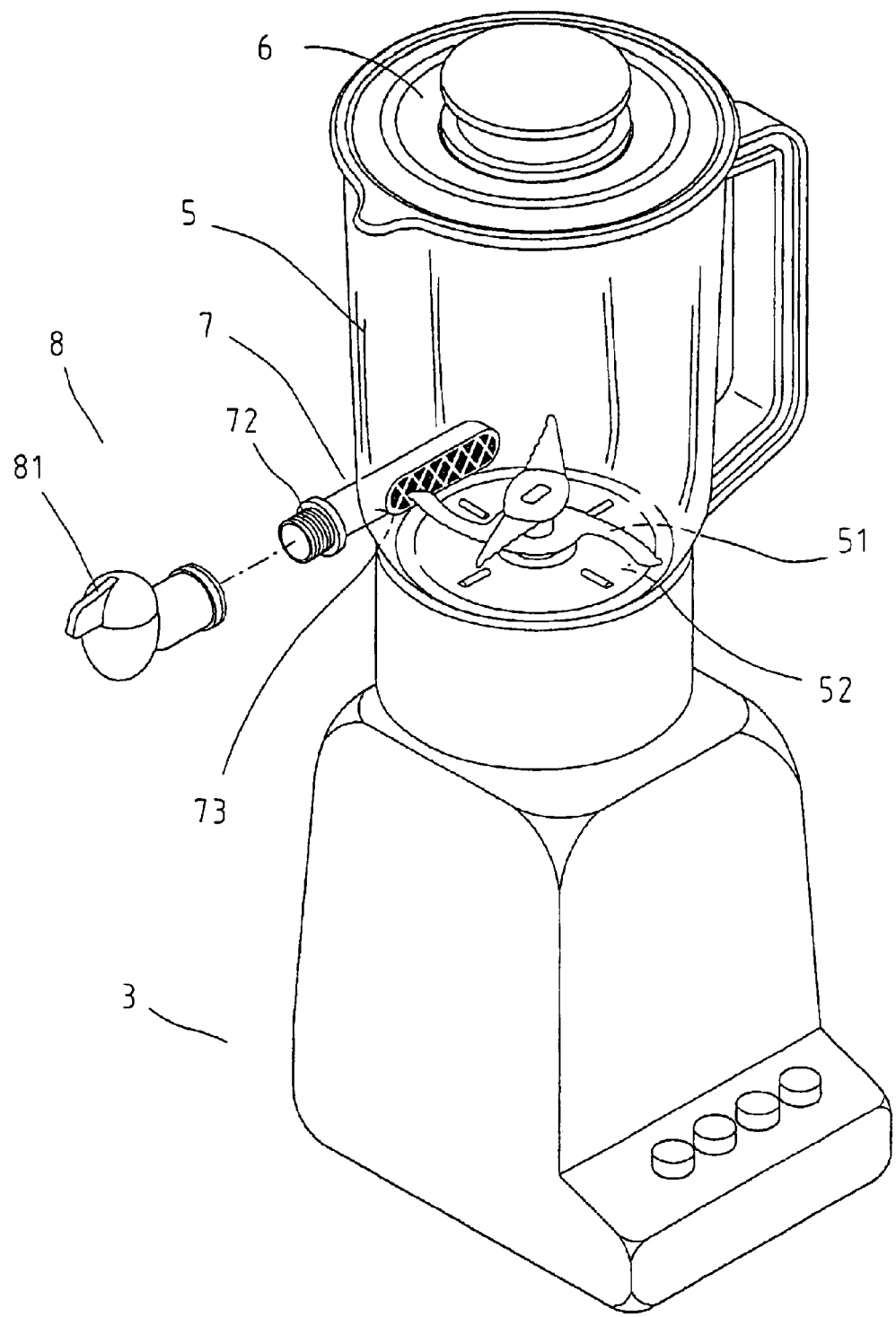
FIG. 5 is a perspective view of a preferred embodiment in accordance with the present invention.

Referring to FIG. 5, in practice, the filter 73 is positioned at the connection between the passage 7 and the cup body 5, and the connector 72 is positioned with the outlet component 8 and the interior of the passage 7 does not need a filter body 71. This will similarly provide filtering and when the blade 51 is driven to drive so as to produce a centrifugal force, the efficiency of filtering is improved and the time for filtering is reduced.

Figure 6:
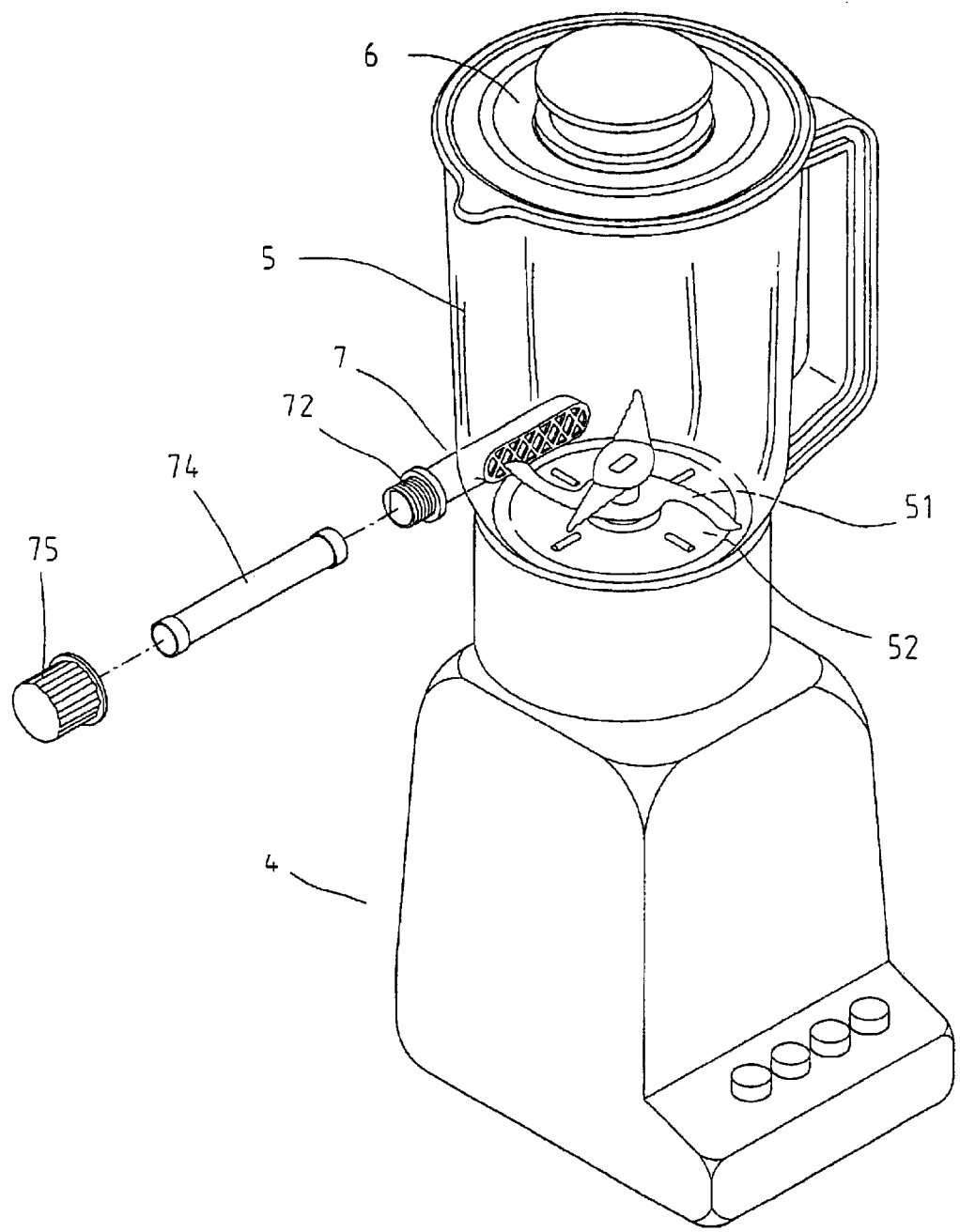
FIGS. 6, 7 and 8 are perspective views of further preferred embodiment in accordance with the present invention.
Figure 7:
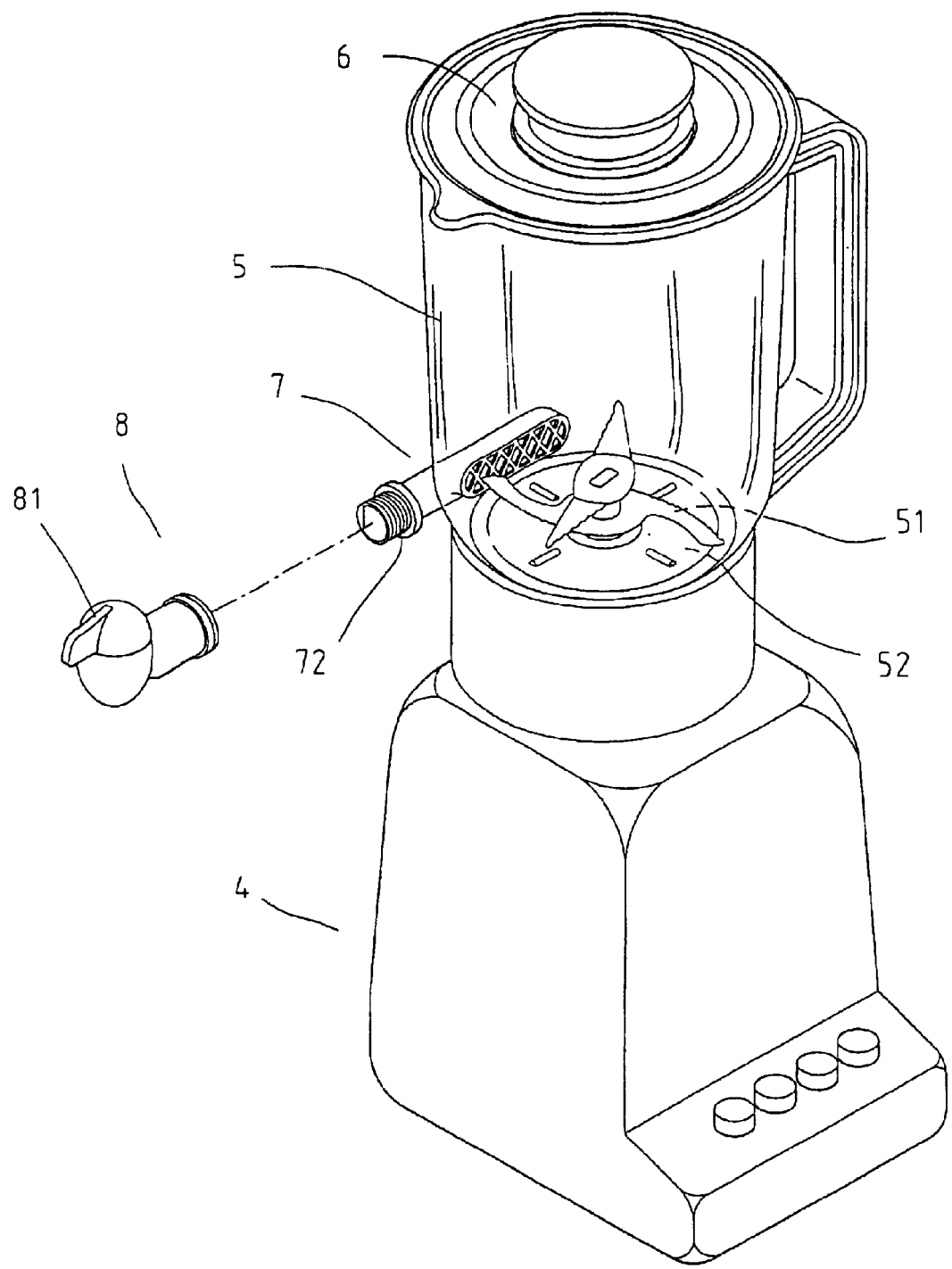

As shown in FIG. 6, when no filtering is needed, a plug component is mounted at the interior of the passage 7 and the blocking body 74 has sealed circumferential edge. The blocking body 74 blocks the connection between the passage and the cup body 5, and a plug head 75 is positioned at the opening at the end of the passage 7 so as to ensure sealing and allow the crushed juice to be poured out by slanting the cup body 5. As shown in FIG. 7, the connector 72 at the end terminal of the passage 7 has an outlet component 8. When the food stuff is crushed to juice, the valve 81 of the outlet component 8 is rotated and juice will flow out without slanting the cup body 5. A little force is used to obtain the crushed juice.

Figure 8:
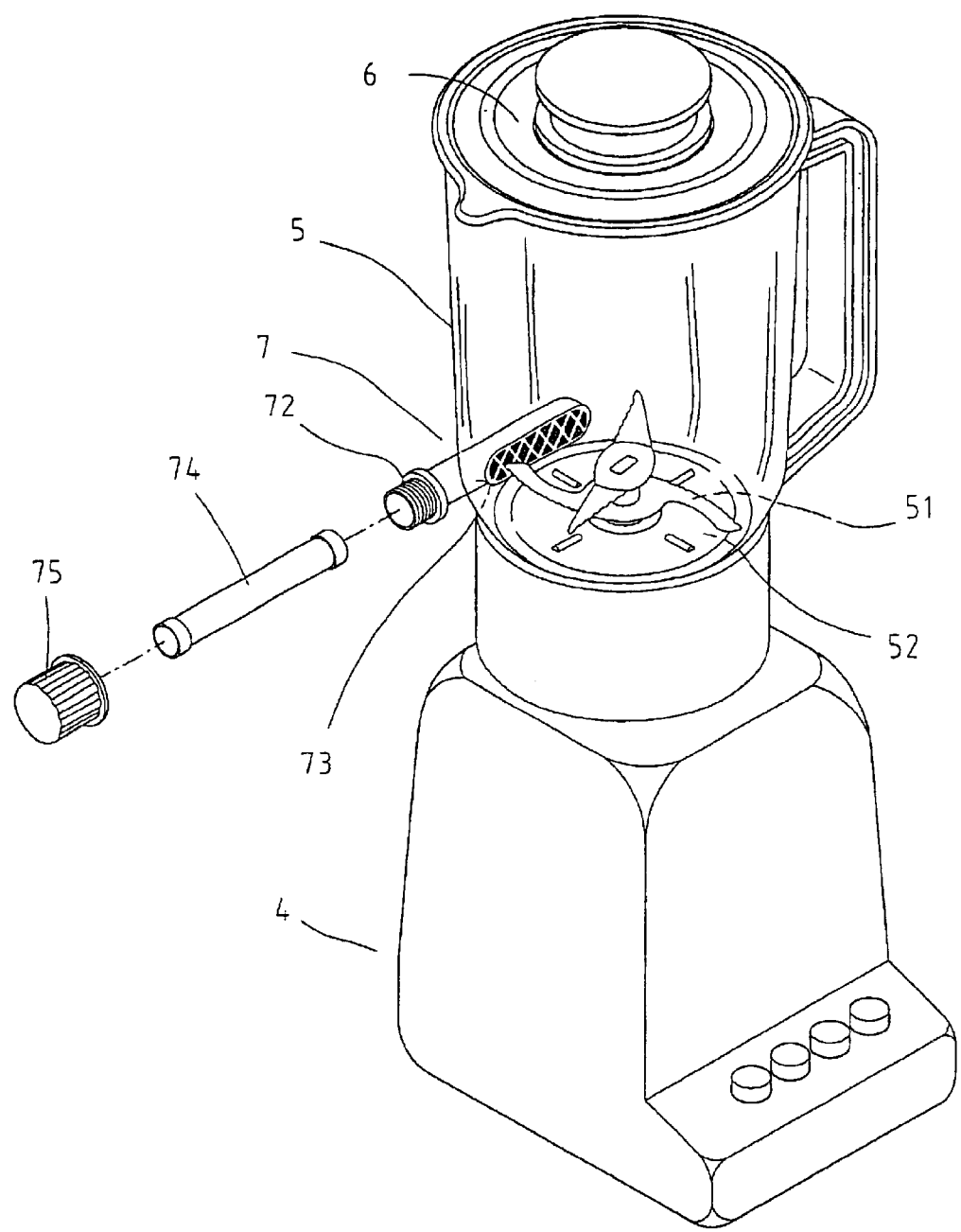

When a filter 73 is positioned at the connection between the passage 7 and the cup body 5, as shown in FIG. 8, the blocking body 74 having sealed circumferential edge is mounted to the passage 7 and a plug head 75 is mounted to the connector 72 so that the passage 7 is sealed and the crushed juice can be poured directly from the cup body 5.

As the interior of the passage can be mounted with a filter body 71 with filter, or a blocking body 74 with sealed circumferential edge, the juice needs to be filtered prior to drinking. The filter body 71 is mounted to the interior of the passage so as to proceed with filtering. When filtering is not needed, the blocking body 74 is used and is positioned so that juice cannot enter the passage 7. In other words, only a single cup body 5 is required to produce two functions. In addition, the volume of the filter body 71 or the blocking body 74 is small and therefore the processor can be easily stored. Further, when the crushed juice needs to be filtered, the passage 7 is protruded outward, the rotation of the blade 51 will cause the juice to centrifuge outward and the juice has a more powerful contact with the filter of the filtering body 71. Thus the filtering effect is improved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood th various omissions, modifications, substitutions and changes in the forms and details of the device illustrated and in its operation can be made by those skilled in the art without departing in any way from the spirit of the present invention.

I claim:

1. An improved structure of a fruit and vegetable processor having a base seat mounted with a cup body with a cup cover on an opening at an upper side of the cup body, and having a blade at a bottom plate at an interior of the cup body, the blade being driven by a motor positioned at the interior of the base seat and a passage connecting the interior of the cup body and having an outlet, wherein the passage is located at an upper portion of the bottom plate below one side of the circumferential edge of the cup body.

2. The processor of claim 1, wherein a filter is provided to the connection between the passage and the cup body.

3. The processor of claim 1, wherein an end terminal of the passage is provided with a connector mounted with an output component having a valve.

4. The processor of claim 1, wherein a plug head is mounted at an end terminal of the passage.

5. The processor of claim 1, wherein an interior of the passage is mounted with a plug component.

6. The processor of claim 5, wherein the plug component has a filtering body with a filter at a circumferential edge.

7. The processor of claim 6, wherein the plug component is a blocking body which is sealed at the circumferential edge.

* * * * *